United States Patent [19]
Busch et al.

[11] Patent Number: 5,477,239
[45] Date of Patent: Dec. 19, 1995

[54] FRONT LIGHTING SYSTEM FOR LIQUID CRYSTAL DISPLAY

[75] Inventors: John Busch; George Scheib, both of Austin, Tex.

[73] Assignee: Dell USA, L.P., Austin, Tex.

[21] Appl. No.: 151,486

[22] Filed: Nov. 12, 1993

[51] Int. Cl.[6] ........................................... G02F 1/13
[52] U.S. Cl. ..................... 345/102; 359/48; 359/75
[58] Field of Search ........................ 345/102, 101, 345/84, 87; 359/48, 49, 50, 75, 40; 361/680, 681, 682, 683; 362/29, 30, 31; 385/129, 146, 901

[56] References Cited

U.S. PATENT DOCUMENTS

| | | | |
|---|---|---|---|
| 4,453,200 | 6/1984 | Trecks et al. | 359/48 |
| 4,684,939 | 8/1987 | Streit | 345/102 |
| 4,822,145 | 4/1989 | Staelin | 359/40 |
| 4,842,378 | 6/1989 | Flasck et al. | 345/102 |
| 4,984,144 | 1/1991 | Cobb, Jr. et al. | 362/31 |
| 5,030,943 | 7/1991 | Anglin | 345/102 |
| 5,040,878 | 8/1991 | Eichenlaub | 359/49 |
| 5,050,946 | 9/1991 | Hathaway et al. | 362/31 |
| 5,070,431 | 12/1991 | Kitazawa et al. | 362/30 |
| 5,091,832 | 2/1992 | Tortola et al. | 345/87 |
| 5,091,873 | 2/1992 | Araki | 361/681 |
| 5,099,343 | 3/1992 | Margerum et al. | 362/31 |
| 5,161,041 | 11/1992 | Abileah et al. | 359/40 |
| 5,283,673 | 2/1994 | Murase et al. | 359/49 |

Primary Examiner—Richard Hjerpe
Assistant Examiner—Steven J. Saras
Attorney, Agent, or Firm—David McCombs; James Huffman

[57] ABSTRACT

A system is disclosed for providing a supplemental front lighting system for a liquid crystal display. Retractable light sources are provided adjacent to the LCD. The light sources may be placed in a closed position for compactness when storing the system or when ambient lighting is adequate. The light sources may be placed in an open position when supplemental lighting of the LCD is desired. A grazing incidence reflecting film having a micro replicated surface is applied to the front surface of the LCD to increase light transmission and to collimate and direct light toward the LCD. Multifaceted microstructures arranged in longitudinal columns on the front surface of the film reduce reflection of light at glancing angles, thereby providing for improved and even lighting across the entire LCD.

18 Claims, 4 Drawing Sheets

FRONT LIGHTING SYSTEM FOR LIQUID CRYSTAL DISPLAY

TECHNICAL FIELD

The invention relates generally to liquid crystal displays (LCDs) and particularly to a front lighting system for a liquid crystal display.

BACKGROUND OF THE INVENTION

Liquid crystal displays (LCDs) are used in portable computers and other electronic devices to display information. LCDs modulate light to create images using selectively transmissive and opaque portions of the display, the selection being controlled by passing electric current through the liquid crystal material. LCDs are available in transmissive, reflective and transflective versions. A transmissive LCD is illuminated by an artificial backlight positioned behind the LCD glass to provide the contrast between the light transmissive and opaque portions of the display. The transmissive LCD can be adequately viewed only when the backlight is illuminated. When the backlight is illuminated, this type of LCD is very readable in low to medium light, with a typical contrast ratio of 18:1 for the very best LCDs. Under strong lighting conditions, however, the contrast ratio is significantly lower, making the LCD more difficult to read. Another drawback to transmissive LCDs is that the backlight consumes a significant amount of power making them somewhat undesirable for use with portable devices, in which power conservation is a concern.

A reflective LCD has a rear reflective surface and is illuminated from the front of the display, typically by ambient light similar to LCD watches, to provide the contrast necessary for readability. Reflective LCDs provide a fairly high contrast in medium to strong light, but are difficult, if not impossible to read in low or nonexistent light. On the positive side, however, because a backlight is not used, reflective LCDs consume considerably less power than their transmissive counterparts.

A transflective LCD is a combination of the other two types of LCDs and operates in both transmissive and reflective modes. A one way reflective layer behind the display reflects ambient light striking the front of the display, and also permits light to be transmitted through the display from a backlight. In bright or average ambient light conditions, the LCD is adequately illuminated from the front by light reflecting from the reflective side of the layer. In low ambient light conditions, the backlight may be activated to illuminate the display through the transmissive side of the layer. Although transflective displays combine many of the benefits of the other two types of displays, a major drawback to such displays is that, due to the reflective layer, a very strong backlight is necessary to sufficiently illuminate the screen in low light conditions, such that a transflective LCD will consume more power with the backlight on than will a normal transmissive LCD.

Transmissive or transflective LCDs are popular in personal computer systems because backlighting as a source of illumination provides the necessary contrast ratios and brightness for viewing the display. However, as previously indicated, relatively large amounts of light are required to light the display due to the extremely low percentage of light transmission through the display. For example, monochrome LCDs are only approximately ten percent transmissive. Full color, active matrix LCDs have absorptive dies and addressing structures that only allow light transmission in the range of five percent or less. Transflective LCDs further limit light transmission because the one way reflective layer is not highly transmissive. While backlit LCDs have several advantages in that sufficient light is always available, they are very inefficient in their use of power to provide an acceptable display.

An additional problem associated with the use of transflective LCDs, as opposed to reflective LCDs, is their relatively poor ability to reflect ambient light. A reflective LCD, for example, is capable of being used in lower light conditions than is a transflective LCD. Thus, as ambient light falls below average, a transflective LCD must turn on its backlight, and thus drain precious battery power, before a reflective LCD would become unreadable.

LCD power consumption is a major concern in portable devices which run on batteries. Various power management techniques have been devised which operate to disable the LCD backlight and thus "blank" the display during periods of non use, with significant power savings. Unfortunately, such techniques tend to blank the screen at times inconvenient to the user, and further do not correct the fundamental power inefficiencies of backlighting systems.

Reflective LCDs, which are adequately illuminated in high ambient light conditions, have also been equipped with artificial front lighting systems, for use in low light conditions. Front lit reflective systems consume less power than comparable backlit transflective systems because there are no transmission losses effected by the one way reflective layer. A front lit reflective LCD therefore is an attractive alternative to a backlit system because of this reduced power requirement in combination with the ability to view the display in high ambient light without artificial illumination.

However, there are several problems associated with conventional front lighting systems for reflective LCDs. Many designs do not uniformly illuminate the display because the light source is located at one or more sides of the display to avoid obstructing its view.

The glancing angle, or angle of incidence, of light impinging on the surface of the display decreases with distance from the light source, with less light entering the display as the angle decreases. As used herein, "glancing angle" and "angle of incidence" are used interchangeably to refer to the angle at which a ray of light strikes the surface of the LCD. At sufficiently low glancing angles, light is completely reflected and does not illuminate the display. One design developed for relatively small LCDs provides a uniformly lit display by mounting the light source in a box like structure placed over the display. The structure has reflective side walls that surround the display to define a viewing window and to support the light source elevated above the display. While efficient to illuminate a compact LCD, the design is cumbersome and not readily adaptable to larger LCDs where a relatively flat LCD panel is preferred. Moreover, the walls of the structure tend to partially obstruct the view of the display to an extent unacceptable for most applications.

What is needed is a front lighting system for a reflective LCD that uniformly illuminates the display without obstructing its view and which provides for an unobtrusive, relatively flat LCD panel configuration. This would be especially useful for portable electronic devices with relatively large LCDs where size and power consumption efficiency are important considerations.

SUMMARY OF THE INVENTION

The foregoing problems are solved and a technical advance is achieved by apparatus and method for uniformly illuminating a reflective LCD from the front of the display. In a departure from the art, a front lighting system of the invention includes a grazing incidence reflective layer on the display surface and a low profile, artificial light source at the periphery of the display for illuminating the display in low ambient light conditions. The reflective layer has a faceted microstructure to direct light impinging on the display from the source at varying low angles of incidence evenly into all portions of the display.

In one illustrative embodiment, the system comprises a specially designed reflective LCD housing having two light sources.

A technical advantage achieved with the invention is an LCD which is artificially illuminated from the front without unduly obstructing the view of the display.

Another technical advantage achieved is a front lighting system for an LCD which is unobtrusive and which enables a relatively flat LCD panel configuration. This is especially advantageous for LCDs in portable computer devices.

A further technical advantage achieved by the present invention is a from lit LCD display system which provides a retractable light source which is easily integrated within a flat panel display.

Another technical advantage achieved is a front lighting system which evenly illuminates all portions of the display from the periphery by reducing grazing incidence reflection near the center of the display.

DESCRIPTION OF THE PREFERRED EMBODIMENT

Figure 1:
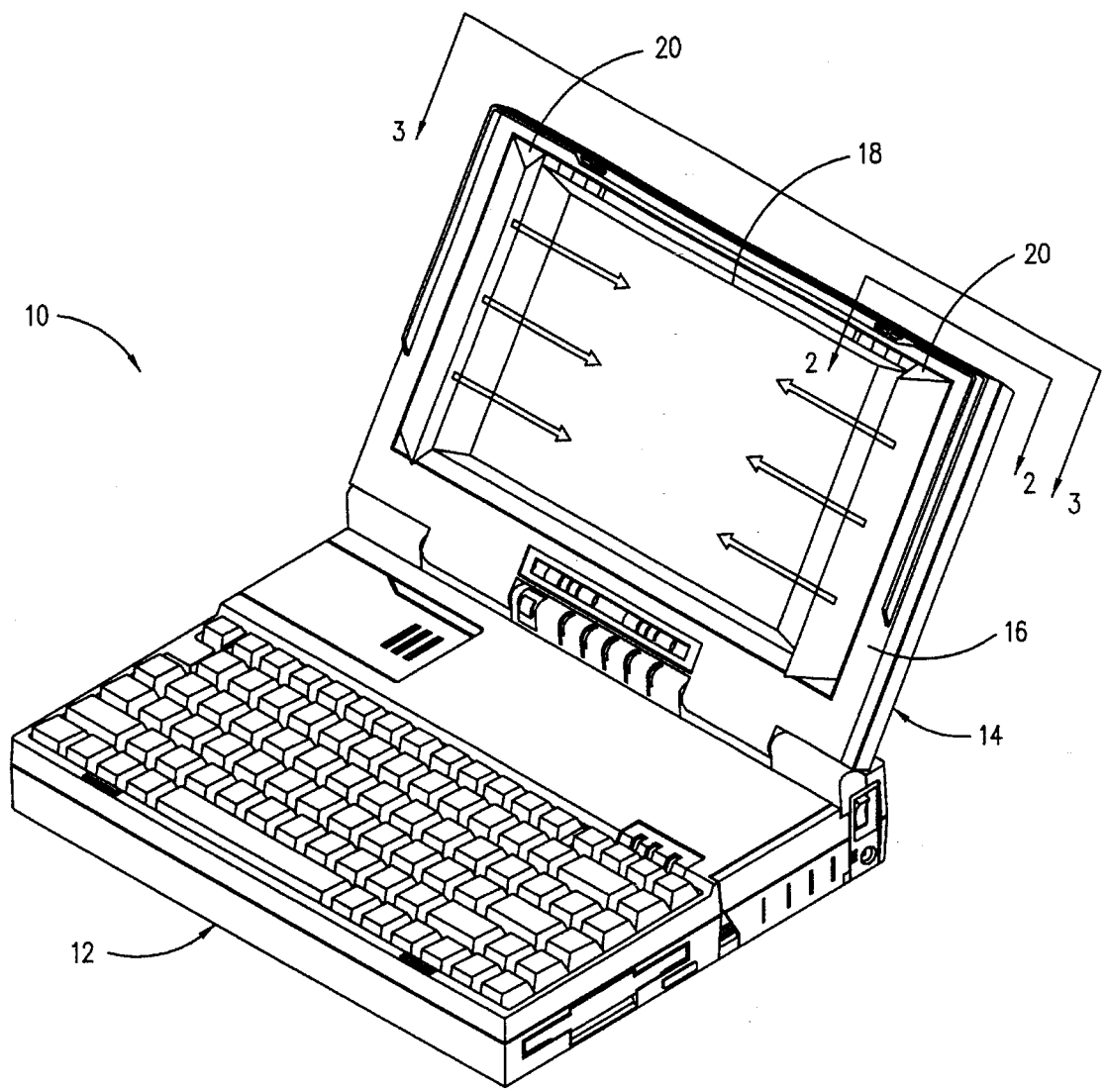
FIG. 1 is a perspective view of a portable computer with a liquid crystal display front-lighting system incorporating features of the present invention.

In FIG. 1, the reference numeral 10 designates a portable computer system incorporating the features of the present invention. The system 10 includes a base 12 and a display system 14. The display system 14 includes a lid 16, a reflective LCD 18, and light sources 20.

Figure 2A:
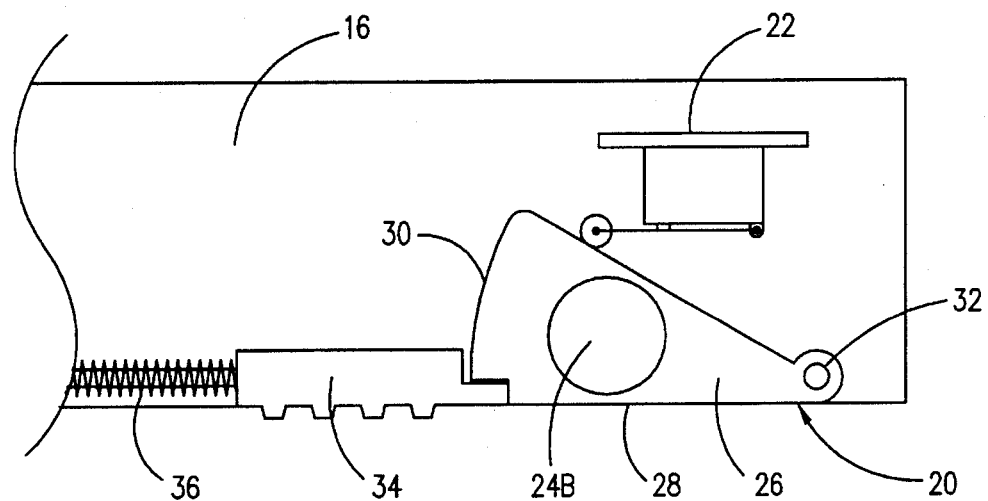
FIGS. 2A and 2B are enlarged, cross-sectional views of the front lighting system taken along line 2—2 of FIG. 1 showing alternate positions of the retractable light source.
Figure 2B:
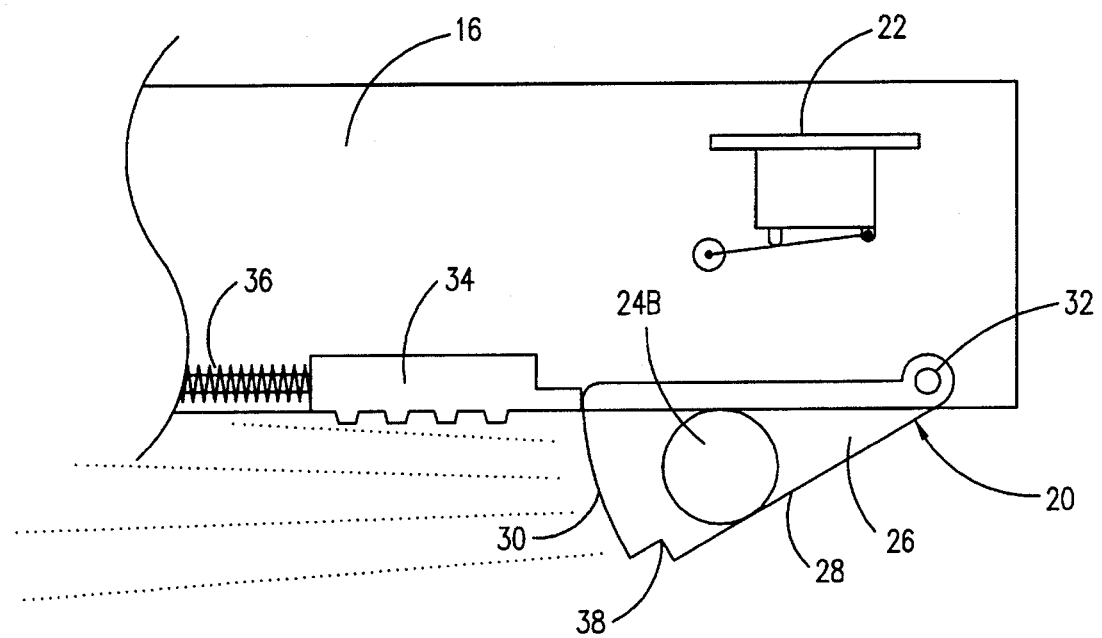

As best shown in FIGS. 2A and 2B, each light source 20 includes a switch 22, a fluorescent tube or bulb 24A and 24B, and a housing 26 having a cover 28 and a lens 30. The bulb is secured within the housing 26, and the housing 26 is pivotally connected to the display housing 16 by a spring hinge 32. The housing 26 is rotatable between a closed position (FIG. 2A) and an open position (FIG. 2B), with the spring hinge 32 urging the housing 26 toward the open position. In the closed position, the housing 26 contacts the switch 22 to keep the bulb 24A or 24B turned off, and in the open position the housing 26 is removed from contact with the switch 22 to turn the bulb 24A or 24B on. A spring loaded latch 34 is disposed in the lid 16, so that the spring 36 urges the latch 34 toward the housing 26. When the housing 26 is in the closed position (FIG. 2A), the latch 34 mates with a notch 38 in the housing 26 to retain the housing 26 in the closed position. The latch 34 may be manually moved away from the housing 26 so that the latch 34 clears the notch 38, permitting the spring hinge 32 to move the housing 26 to the open position.

Figure 3:
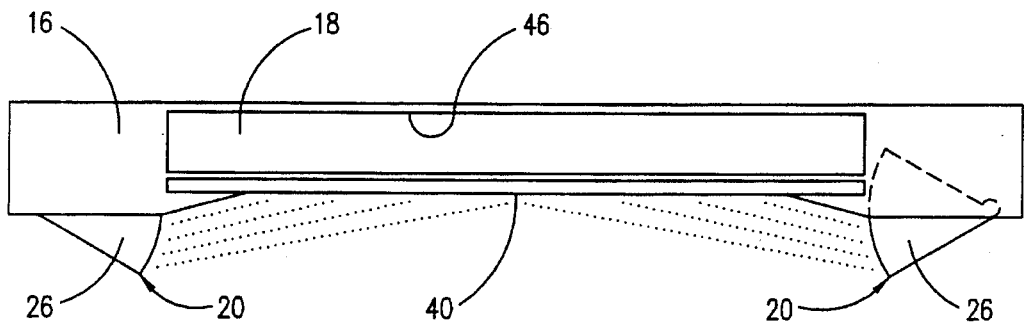
FIG. 3 is a schematic view taken along line 3—3 of FIG. 1.

As shown in FIG. 3, a grazing incidence reflecting film 40 made of a transparent polymer is applied to the front surface of the LCD 18. The film 40 has a microreplicated surface designed to increase optical transmission at glancing angles and to direct the light toward the LCD 18. The micro replicated surface is designed to provide a plurality of transparent, multifaceted microstructures 42 which are disposed along the front surface of the film 40 for directing light toward the LCD 18 and collimating the light as the light passes through the film 40 toward the LCD, as will be described.

Figure 4:
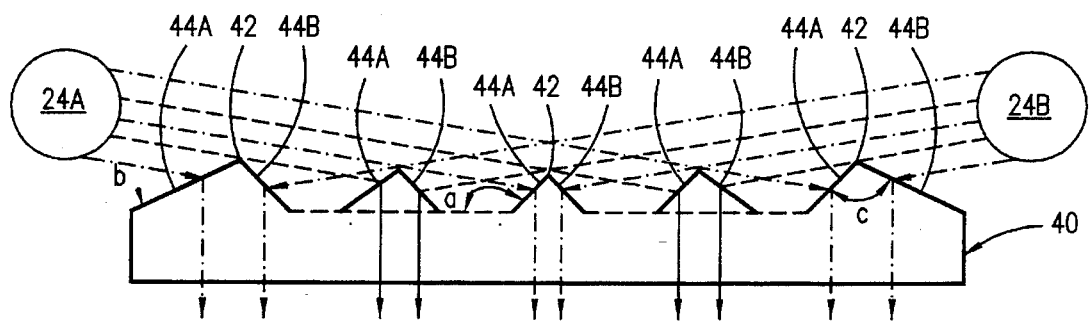
FIG. 4 is an enlarged, schematic cross section of a grazing incidence reflecting film of the present invention showing refraction of light through micro structures in the front surface of the film.

FIG. 4 illustrates the arrangement of the microstructures 42 and the manner in which light passes from the bulbs 24A and 24B, through the facets 44A and 44B of the microstructures 42, and through the film 40. The facets 44A and 44B are disposed to increase the transmission of light at glancing angles and to collimate light from the light source as the light passes through the film 40 to the LCD 18. In that regard, as the distance between a facet 44A or 44B and its corresponding light source 24A or 24B increases, i.e., as the microstructures 42 get closer to the center of the LCD, the obtuse angle "a" decreases, providing for an artificially increasing glancing angle "b" between the rays of light from the bulbs 24A and 24B and the surface of the film 40, thereby decreasing reflection and increasing light transmission through the film 40 to the LCD 18. The microstructures 42 are arranged to form columns of facets 44A, 44B which run from the top to the bottom of the LCD 18, wherein each micro structure in a single column forms the same obtuse angle "a" with the film 40.

Figure 5:
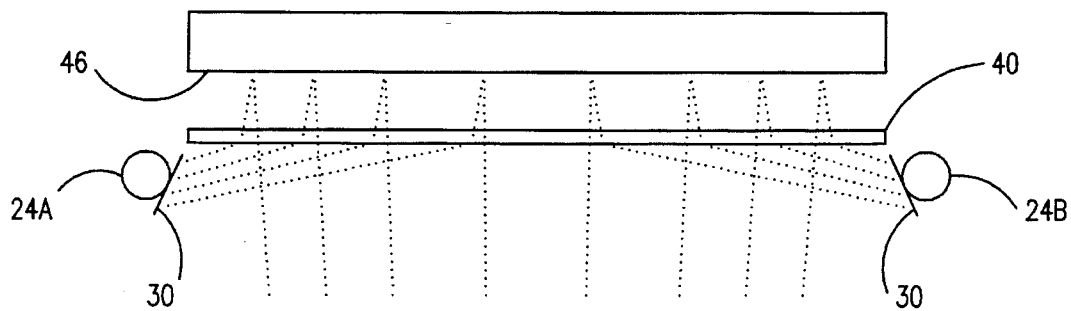
FIG. 5 is an optical schematic diagram of the system of FIG. 1 showing refraction of light to the display by a grazing incidence reflective layer.

The light passes through the film 40 and the LCD 18 to the reflective surface 46 of the LCD 18 and is reflected back through the LCD 18 and film 40 toward the user, as illustrated in FIG. 5. Because the light entering the LCD 18 is collimated as it passes through the film 40, the reflective surface 46 of the LCD 18 should provide for some diffuse scattering. A secondary image will result due to refraction of the light as it exits the microstructures 42, but the secondary image intensity can be reduced to less than 10% of the primary image intensity with little effect upon the coupling efficiency of the film 40.

Figure 6:
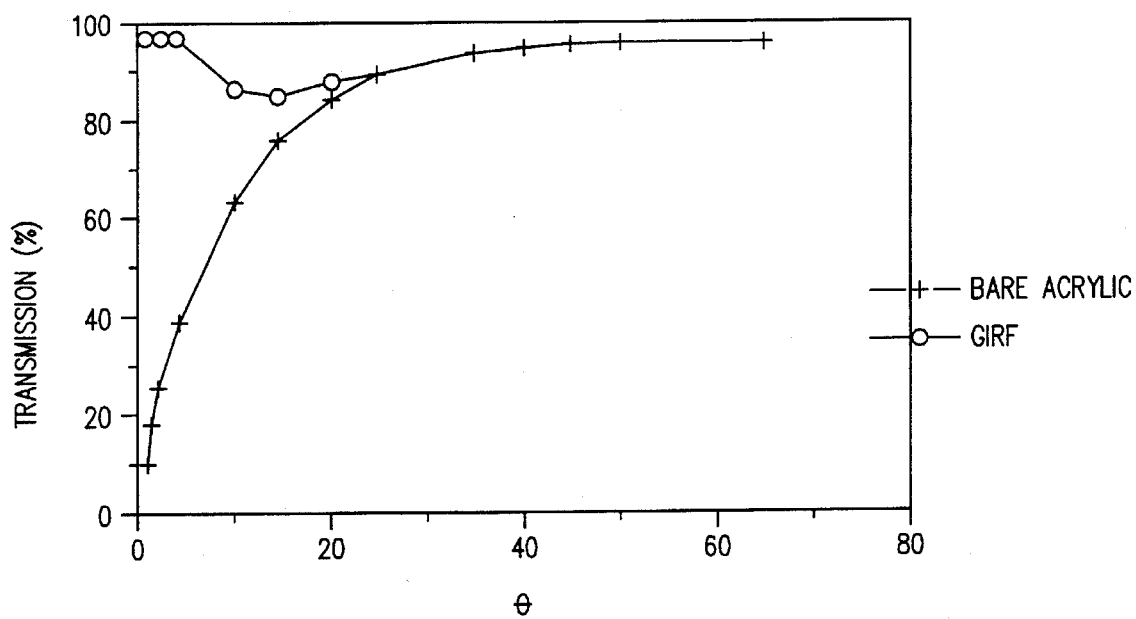
FIG. 6 is a graph illustrating percent light transmission as a function of angle of incidence from horizontal for the system of FIG. 1.

FIG. 6 was prepared using a ray tracing program to simulate performance of a bare acrylic display surface and to simulate performance of a display surface having a glazing incidence reflecting film 40. FIG. 6 illustrates the dependence of light transmission efficiency upon the angle of incidence of light relative to the plane of the front surface of an LCD having a bare acrylic surface and relative to the plane of the front surface of an LCD having a glazing incidence reflecting film 40 and demonstrates the advantages provided by the film 40.

For example, for a display system 14 having an LCD 18 that has a height of approximately 4.8" and a width of approximately 6.4" and having a light source 20 approximately 0.25" high, the angle of incidence between the LCD 18 surface and light from the center of the light source 20 is approximately 3°. As illustrated in FIG. 6, at an angle of incidence of approximately 3°, transmission efficiency for a bare acrylic screen is approximately 26% as compared to over 90% for an LCD coated with a glazing incidence reflecting film 40 of the present invention.

In operation, under normal lighting conditions, the portable computer system 10 of the present invention is utilized without supplemental lighting. The housings 26 are maintained in the closed position by the latches 34, and the bulbs 24A and 24B are off, to avoid unnecessary power usage. When lighting conditions become inadequate, the latches 34 are urged inwardly away from the housings 26 to permit the spring hinges 32 to move the housings 26 to the open position, with the bulbs 24A and 24B now turned on.

Light from the light sources 20 passes through the facets 44A and 44B of the film 40 so that the light rays passing through the film 40 and to the LCD 18 is collimated. The light rays strike the reflective surface 46 of the LCD 18 and are reflected back, with some diffuse scattering, toward the user.

It is understood that the present invention can take many forms and embodiments. The embodiments shown herein are intended to illustrate rather than to limit the invention, it being appreciated that variations may be made without departing from the spirit or the scope of the invention. For example, one or any number of retractable light sources 20 may be used in connection with the display system 14. Also, the retractable light sources 20 may be secured to the display housing 16 in any conventional manner, and the bulbs 24A and 24B may be secured within the lid 16 rather than directly to the housings 26, with reflectors being used to direct the light across the film 40 and LCD 18. Further, it is also anticipated that the film 40 may be used in connection with transmissive or transflective systems as well, with the film 40 being applied where needed, to provide the improved light transmission and to direct the light as desired. Although disclosed in connection with a portable computer system 10, it is understood that various devices may employ features of the invention.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A front-lit display system comprising:

a liquid crystal display;

a light source disposed adjacent to said display; and a transparent film disposed on an outer surface of said display, said film having a plurality of multifaceted microstructures disposed along a front surface of said film to increase transmission of light at glancing angles through said film and to direct light toward said display;

wherein outer surfaces of each of said plurality of microstructures have first and second facets which extend outwardly away from a plane of said film, said first and second facets of each of said plurality of microstructures intersecting at outer edges and facing first and second opposing sides of said film, respectively; and wherein each of said plurality of first facets forms an obtuse angle with said plane of said film, and said obtuse angles decrease incrementally with distance of each of said plurality of first facets from said first side of said film.

2. The display system of claim 1 wherein said microstructures are arranged in longitudinal columns with respect to said display.

3. The display system of claim 1 wherein:

outer surfaces of each of said plurality of microstructures have first and second facets which extend outwardly away from a plane of said film, said first and second facets of each of said plurality of microstructures intersecting at outer edges and facing first and second opposing sides of said film, respectively; and wherein each of said plurality of first facets forms an obtuse angle with said plane of said film, and said obtuse angles decrease incrementally with distance of each of said plurality of first facets from said first side of said film.

4. The display system of claim 3 wherein each of said plurality of second facets forms an obtuse angle with said plane of said film, and said obtuse angles decrease incrementally with distance of each of said plurality of second facets from said second side of said film.

5. The display system of claim 1 further comprising a lid within which said display is disposed.

6. The display system of claim 5 wherein said lid has an aperture adjacent to said display and said light source is secured to said lid and retractable within said aperture.

7. The display system of claim 6 wherein said aperture comprises first and second apertures and wherein said light source comprises:

a first housing movably connected to said lid and extending along a first side of said display, said first housing being retractable within said first aperture;

a second housing movably connected to said lid and extending along a second, opposing side of said display, said second housing being retractable within said second aperture; and first and second bulbs secured to said first and second housings, respectively.

8. The display system of claim 6 wherein said housing has a front edge extending along a side of said display, and a rear edge extending opposite said front edge; said rear edge being pivotally secured to said lid so that said housing may be moved between a closed position in which said housing is disposed substantially within said aperture and an open position in which at least a portion of said housing extends outwardly from said aperture adjacent to said display.

9. The display system of claim 8 wherein said plurality of microstructures are aligned so that said first and second facets collimate said light from said light source as said light passes through said film and toward said display.

10. The display system of claim 8 wherein said bulb is secured to said housing so that said bulb is retracted within said aperture when said housing is in said closed position and extends outwardly from said aperture when said housing is in said open position.

11. The display system of claim 8 further comprising a switch disposed within said aperture for turning said bulb off and on when said housing is in said closed position and open positions, respectively.

12. The display system of claim 11 wherein:

said rear edge is pivotally secured to said lid by a spring hinge which biases said housing toward said open position; and further comprising a latch secured to said lid adjacent to said front edge of said housing, said latch being movable between a retaining position in which said latch retains said housing in said closed position, and a release position in which said latch permits said housing to move to said open position.

13. The apparatus of claim 1 wherein said film comprises a transparent polymer.

14. A method of illuminating a liquid crystal display system comprising:

provide a display system having a liquid crystal display;

providing a transparent film on a surface of said display, said film having a plurality of multifaceted microstructures disposed along an outer surface of said film wherein outer surfaces of each of said plurality of microstructures have first and second facets which extend outwardly away from a plane of said film, said first and second facets of each of said plurality of microstructures intersecting at outer edges and facing first and second opposing sides of said film, respectively; and wherein each of said plurality of first facets forms an obtuse angle with said plane of said film, and said obtuse angles decrease incrementally with distance of each of said plurality of first facets from said first side of said film;

providing a light source disposed near said display;

directing light from said light source across said film at relatively small angles of incidence with said film; and refracting said light through said film to substantially collimate said light as said light passes through said film to said display.

15. The method of claim 14 further comprising reflecting said collimated light back through said display and said film.

16. The method of claim 15 wherein said film is disposed on a front surface of said display and wherein said light is directed from said light source to and through a front surface of said film.

17. The method of claim 14 wherein said multifaceted microstructures are arranged in longitudinal columns.

18. The method of claim 14 wherein said multifaceted microstructures are arranged such that the amount of light transmitted to said display is greater than the amount of light transmitted to said display in the absence of said multifaceted microstructures.

* * * * *